Oct. 6, 1925.
J. STIRISS
1,556,371
SPECTACLE FRAME
Filed Oct. 9, 1923
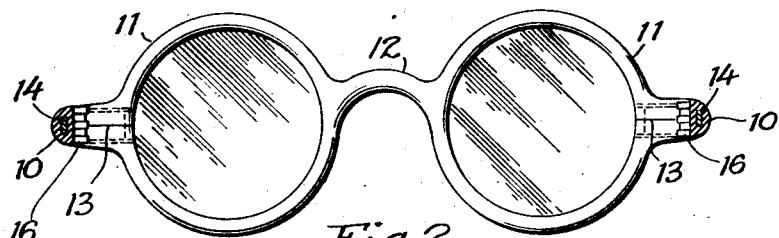
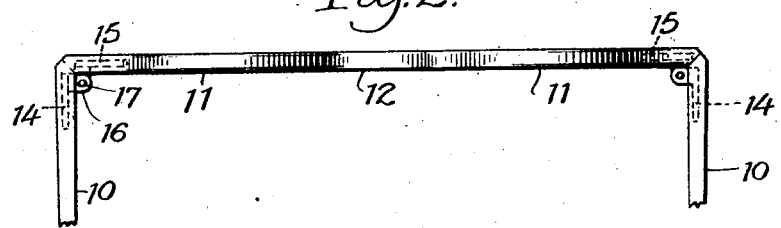
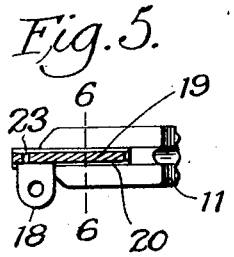
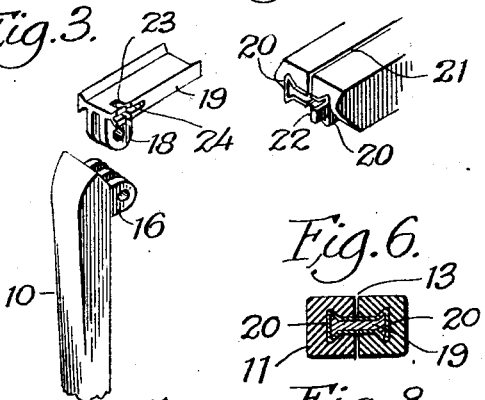
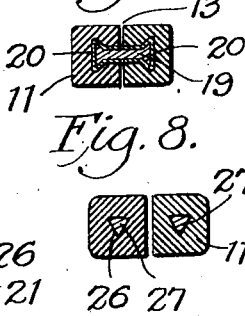
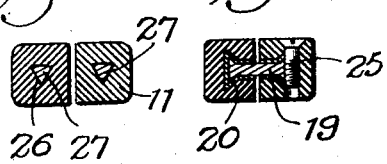
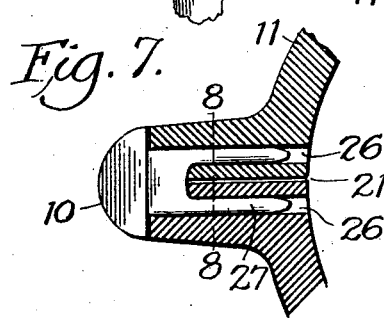
Inventor,
Jacob Stiriss,
By James F. Duhamel,
Attorney Patented Oct. 6, 1925.

1,556,371

UNITED STATES PATENT OFFICE.

JACOB STIRISS, OF NEW YORK, N. Y.

SPECTACLE FRAME.

Application filed October 9, 1923. Serial No. 667,516.

*To all whom it may concern:*

Be it known that I, JACOB STIRISS, a resident of the city, county, and State of New York, and a citizen of the United States, have invented certain new and useful Improvements in Spectacle Frames, of which the following is a specification.

This invention relates to spectacle frames and more especially to the adjustment of the frames for the lenses and the hinges to said frame.

The object of the invention is to provide a sliding hinge member that is fitted into sockets on each side of the slit that admits the lens to the frame, the said member uniting the frame to retain the lens and hinging the temple to each end of the spectacles.

These and other objects and details of the invention are more fully described in the following specification, set forth in the appended claims and illustrated in the accompanying drawings, wherein:

Fig. 1 is a rear view of a pair of celluloid spectacles with the temples in section.

Fig. 2 is a plan view of the same showing the hinge members in dotted lines.

Fig. 3 is a perspective view of the end of the temple with the slide member detached.

Fig. 4 is a perspective view of the adjacent frame end and sockets.

Fig. 5 is a sectional view through the hinge member and sockets.

Fig. 6 is a transverse section through the frame end and sockets on the line 6—6 of Fig. 5.

Fig. 7 is a horizontal section through the frame end showing a modified form of hinge member and sockets.

Fig. 8 is a cross section of the same on line 8—8 of Fig. 7.

Fig. 9 is a cross sectional view showing modified retaining means for the hinge member.

In the production of spectacles of celluloid and similar material considerable difficulty is experienced in locating the lenses within the frame and the most satisfactory method of securing them is by splitting the frame at each side and closing and locking the split sections.

The present invention provides this locking means in connection with the hinges that secure the temples 10 to the lens frames 11, the latter being of the usual circular shape and united by the bridge 12, the frames being slitted and separated at 13 so that the frames may be expanded when the lenses are encircled.

In order to avoid clumsiness the hinges in this class of spectacles are delicate and the members are usually embedded in the parts they are designed to carry. Such is the case with the hinge member 14 that is molded in the temples and has ears 16 exposed to receive the pintle 17 and co-operate with the ears 18 of the slide 19 that constitutes the other hinge member.

Two socket sections 20 are molded in the frame at each end and at the sides of the slit 21 as best shown in Fig. 4 where it will also be seen that the one side of the socket linings is extended outward to form a detent 22 that engages a notch 23 in the slide 19 and locks it in the sockets. When it is desired, however, to detach the temples an instrument may be inserted in a horizontal groove 24 and the detent pressed out of its notch and the parts separated.

A modified form for locking the hinge members together is shown in Fig. 9 where it will be seen that the frame, socket lining and slide are tapped at the edge of the latter and a screw 25 is inserted to hold the parts together but which may be easily removed when it is desired to separate the parts.

Friction may be also relied upon to secure the hinge member to the frame as will be seen in Figs. 7 and 8 where sockets 26 are shown at each side of the slit 21 moulded into the celluloid to receive the prongs 27 of a fork that constitutes one of the hinge members, the prongs being pointed and the friction being sufficient to ensure a rigid hold in the orifices.

The parts above described are not only substantial and capable of withstanding the wear imposed upon spectacles but are hidden from view and do not detract from the ornamental appearance of the device.

It is obvious that the parts may be otherwise arranged and modified without departing from the essential features above described or from the scope of the appended claims.

What I claim as new is:

1. In spectacle frames, the combination of a frame split at each side and having sockets at each side of and parallel with the split, and locking means slid in the sockets to unite the split ends and carried by the temples.

2. In spectacle frames, the combination of a frame split at one side and having sockets extending through the frame parallel with the split and in each side of the same, and hinges for the temple having one member adapted to slide in the sockets and unite the side of the split.

3. In spectacle frames, the combination of a frame divided at one side and having recesses at each side of the division and extending through the frame, and hinge members for the temples comprising slides corresponding with and fitting in the said recesses to unite the frame.

4. In spectacle frames, the combination of split ends to the frame having adjacent sockets parallel with the split, hinges carrying the temples, co-operating hinge members constituting slides adapted to fit the sockets, and means for locking the slides in the sockets.

5. In spectacle frames, the combination of a frame split at one side and having sockets at each side of the split and extending through the frame, a hinge member moulded in the temples, and a second hinge member correspondingly shaped at each side to slide in the recesses and unite the frame.

6. In spectacle frames, the combination of separated ends having adjacent sockets, a hinge member adapted to carry a temple, a co-operating hinge member constituting a slide to fit the sockets, and a detent adapted to engage the slide when inserted in the sockets.

7. In spectacle frames, the combination of separated ends having parallel channels, hinge sections adapted to fit in the channels and hold the ends together, a detent from each end and engaging a notch in a hinge section, a co-operating hinge section adapted to carry the temple, and means permitting the disengaging of the detent.

In testimony whereof I hereunto affix my signature.

JACOB STIRISS.